(12) United States Patent
Kim et al.

(10) Patent No.: US 11,747,039 B2
(45) Date of Patent: Sep. 5, 2023

(54) GAS FURNACE

(71) Applicant: LG ELECTRONICS INC., Seoul (KR)

(72) Inventors: Jusu Kim, Seoul (KR); Doyong Ha, Seoul (KR); Yongki Jeong, Seoul (KR); Janghee Park, Seoul (KR); Hansaem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 16/935,910

(22) Filed: Jul. 22, 2020

(65) Prior Publication Data

US 2021/0025616 A1    Jan. 28, 2021

(30) Foreign Application Priority Data

Jul. 26, 2019   (KR) .......................... 10-2019-0090922

(51) Int. Cl.
| | |
|---|---|
| *F24F 11/65* | (2018.01) |
| *B01D 53/06* | (2006.01) |
| *B01D 53/26* | (2006.01) |
| *F24D 5/04* | (2006.01) |
| *F24F 11/00* | (2018.01) |

(Continued)

(52) U.S. Cl.
CPC .............. *F24F 11/65* (2018.01); *B01D 53/06* (2013.01); *B01D 53/261* (2013.01); *F24D 5/04* (2013.01); *F24F 11/0008* (2013.01); *F24F 13/0236* (2013.01); *F24H 3/025* (2013.01); *F24H 9/0063* (2013.01); *B01D 2253/25* (2013.01); *B01D 2257/80* (2013.01);

(Continued)

(58) Field of Classification Search
CPC .... F24F 11/65; F24F 11/0008; F24F 13/0236; F24F 3/1423; F24F 2203/1004; B01D 53/06; B01D 53/261; B01D 2253/25; B01D 2257/80; B01D 2259/40088; B01D 2259/4508; F24D 5/04; F24H 3/025; F24H 9/0063; F24H 3/065; F24H 8/003; F24H 9/2085

See application file for complete search history.

(56) References Cited

U.S. PATENT DOCUMENTS

| | | | |
|---|---|---|---|
| 4,014,380 A * | 3/1977 | Rush .................... | F24F 3/1423 165/59 |
| 4,269,611 A * | 5/1981 | Anderberg ............ | F24F 3/1423 96/124 |

(Continued)

*Primary Examiner* — Nelson J Nieves
*Assistant Examiner* — Matthew John Moscola
(74) *Attorney, Agent, or Firm* — Bryan Cave Leighton Paisner LLP (57) ABSTRACT

A gas furnace includes: a burner in which a mixture of air and fuel gas burns; a heat exchanger through which a combustion gas produced by the combustion of the mixture flows; a duct including a room air duct through which air coming from a room passes and a supply air duct through which air supplied to the room passes; a blower that induces a flow of the room air supplied as the supply air to the room through the heat exchanger; and a humidification and dehumidification device with no water supply installed on one side of the supply air duct. The amount of moisture contained in the supply air is adjusted by an adsorbent coated on the surface of the humidification and dehumidification device with no water supply.

8 Claims, 10 Drawing Sheets

(51) Int. Cl.
*F24F 13/02* (2006.01)
*F24H 3/02* (2022.01)
*F24H 9/00* (2022.01)
*F24F 3/14* (2006.01)

(52) U.S. Cl.
CPC .. *B01D 2259/40088* (2013.01); *F24F 3/1423* (2013.01); *F24F 2203/1004* (2013.01)

(56) References Cited

U.S. PATENT DOCUMENTS

| | | | |
|---|---|---|---|
| 10,948,202 B2* | 3/2021 | Lee | F24F 3/153 |
| 2011/0197770 A1* | 8/2011 | Yun | F24F 3/1423 |
| | | | 55/438 |
| 2015/0298050 A1* | 10/2015 | Richardson | A23B 7/144 |
| | | | 96/144 |
| 2017/0036160 A1* | 2/2017 | Kitchener | F26B 21/00 |
| 2021/0381703 A1* | 12/2021 | Masuda | F24F 3/044 |

\* cited by examiner

GAS FURNACE

CROSS-REFERENCE TO RELATED APPLICATION

This application claims the priority from Korean Patent Application No. 10-2019-0090922, filed on Jul. 26, 2019, in the Korean Intellectual Property Office, the disclosure of which is incorporated herein by reference in its entirety.

FIELD OF THE DISCLOSURE

The present disclosure relates to a gas furnace. More particularly, the present disclosure relates to a gas furnace that can establish a pleasant indoor environment by regulating the humidity of air supplied to an indoor space, as well as the temperature of air supplied to the indoor space, without water supply or drainage.

RELATED ART

Generally, a gas furnace is an apparatus that heats up a room by supplying air heated through heat exchange with a flame and high-temperature combustion gas produced by the combustion of a fuel gas.

A problem with a gas furnace according to the related art is that hot dry air introduced into a room during a heating operation can cause discomfort to a person in the room.

To solve this problem, a humidification device is often installed to regulate the humidity of air supplied to an indoor space. In this case, it is difficult to install, replace, and repair the humidification device because the installation of water supply and drainage pipes is required.

Besides, there are other problems including leakage due to the aging of the water supply and drainage pipes, pipe freezing and bursting in the winter, and so forth.

SUMMARY OF THE DISCLOSURE

A first problem to be solved by the present disclosure is to provide a gas furnace that can establish a pleasant indoor environment by regulating the humidity of air supplied to an indoor space without water supply, even without the installation of water supply and drainage pipes.

A second problem to be solved by the present disclosure is to provide a gas furnace that can minimize the installation space of a device for regulating the humidity of air supplied to an indoor space A third problem to be solved by the present disclosure is to provide a gas furnace that enables humidity control for both humidification and heating operation and dehumidification and cooling operation by one humidification and dehumidification device.

Technical problems to be solved by the present disclosure are not limited to the above-mentioned technical problems, and other technical problems not mentioned herein may be clearly understood by those skilled in the art from description below.

To solve the above-mentioned problems, there is provided a gas furnace according to the present disclosure including: a burner in which a mixture of air and fuel gas burns; a heat exchanger through which a combustion gas produced by the combustion of the mixture flows; a duct including a room air duct through which air coming from a room passes and a supply air duct through which air supplied to the room passes; a blower that induces a flow of the room air supplied as the supply air to the room through the heat exchanger; and a humidification and dehumidification device with no water supply installed on one side of the supply air duct.

The amount of moisture contained in the supply air may be adjusted by an adsorbent coated on the surface of the humidification and dehumidification device with no water supply.

The humidification and dehumidification device with no water supply may further include a rotor with the adsorbent coated on the surface that rotates in a certain direction, the rotor including a first portion located inside the supply air duct and a second portion located outside the supply air duct, wherein the first and second portions vary in position as the rotor rotates.

The humidification and dehumidification device with no water supply may further include a casing that accommodates the second portion therein and has a first air-through hole and a second air-through hole formed therein, with a flow path of air passing through the second portion between the first and second air-through holes.

The gas furnace may further include: an intake pipe through which air to be supplied to the burner flows; an exhaust pipe through which a combustion gas passed through the heat exchanger flows; and an inducer that induces a flow of fluid from the intake pipe to the exhaust pipe, wherein air introduced from an outside air pipe connected to the first air-through hole, passed through the second portion, and discharged through the second air-through hole flows through the intake pipe, one side of which is connected to the second air pass-through hole.

In some embodiments, the gas furnace may further include a cooling coil disposed inside the supply air duct and having a refrigerant pipeline through which refrigerant flows, wherein the blower induces a flow of the room air supplied as the supply air to the room past the cooling coil. As such, the gas furnace according to the present disclosure is capable of cooling operation as well as heating operation.

The intake pipe and the exhaust pipe each may include a plurality of pipelines connected via a plurality of chambers, with a flow path varying depending on the operation of a damper for regulating the opening and closing of the plurality of pipelines.

The gas furnace may further include a controller that provides either humidification and heating operation or dehumidification and cooling operation by controlling whether to supply the fuel gas to the burner or not, whether to supply the refrigerant to the refrigerant pipeline or not, and the operation of the damper, wherein the humidification and heating operation is an operation in which the room air is heated and humidified while passing through the heat exchanger and the humidification and dehumidification device with no power supply and supplied as the supply air to the room, and the dehumidification and cooling operation is an operation in which the room air is cooled and dehumidified while passing through the cooling coil and the humidification and dehumidification device with no water supply and supplied as the supply air to the room.

When performing the humidification and heating operation, the controller may perform control in such a way as to supply the fuel gas and cut off the supply of the refrigerant to the refrigerant pipeline, and control the operation of the damper in such a way that the air introduced from the outside air pipe connected to the first air-through hole, passed through the second portion, and discharged through the second air-through hole flows through the intake pipe, one side of which is connected to the second air pass-through hole, and the combustion gas passed through the heat exchanger flows through the exhaust pipe.

When performing the dehumidification cooling operation, the controller may perform control in such a way as to supply the refrigerant to the refrigerant pipeline and cut off the supply of the fuel gas to the burner, and control the operation of the damper in such a way that the air introduced from the outside air pipe flows through the intake pipe and the air introduced through the second air pass-through hole, passed through the second portion, and discharged through the first air pass-through hole flows through the exhaust pipe, one side of which is connected to the second air pass-through hole.

The humidification and dehumidification device with no water supply may further include a heater for heating the air introduced through the second air pass-through hole, wherein the controller performs control such that the heater is activated when performing the dehumidification and cooling operation.

Means for solving other problems not mentioned above will be easily deduced from the descriptions of embodiments of the present disclosure.

DESCRIPTION OF EXEMPLARY EMBODIMENTS

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is merely defined by the scope of the claims. Like reference numerals refer to like elements throughout the specification.

The present disclosure will be described with respect to a spatial orthogonal coordinate system illustrated in FIG. 3 and other figures where X, Y, and Z axes are orthogonal to each other. In this specification, the X axis, Y axis, and Z axis are defined assuming that the up-down direction is along the Z axis and the front-back direction is along the X axis. Each axis direction (X-axis direction, Y-axis direction, and Z-axis direction) refers to two directions in which each axis runs. Each axis direction with a '+' sign in front of it (+X-axis direction, +Y-axis direction, and +Z-axis direction) refers to a positive direction which is one of the two directions in which each axis runs. Each axis direction with a '−' sign in front of it (−X-axis direction, −Y-axis direction, and −Z-axis direction) refers to a negative direction which is the other of the two directions in which each axis runs.

Hereinafter, a gas furnace according to an exemplary embodiment of the present disclosure will be described with reference to FIGS. 1 to 3.

Figure 1:
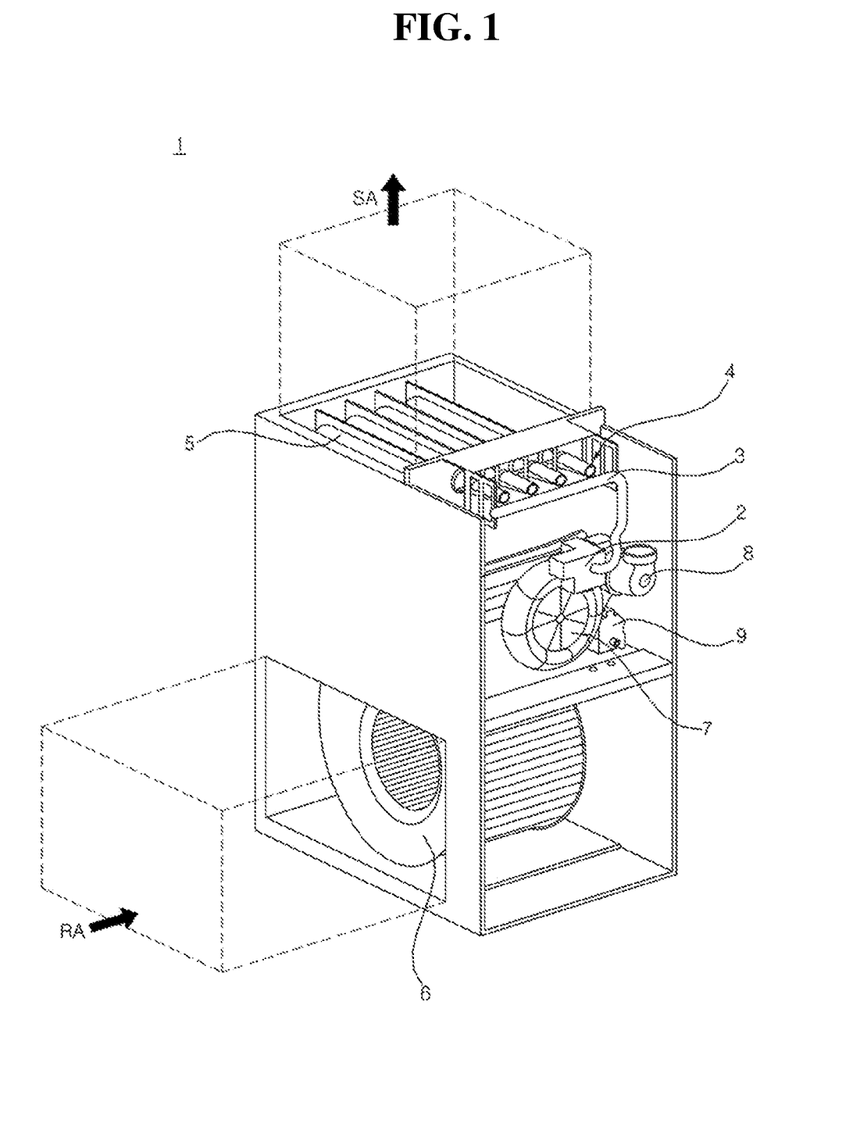
FIG. 1 is a perspective view of a gas furnace according to the related art.
Figure 2:
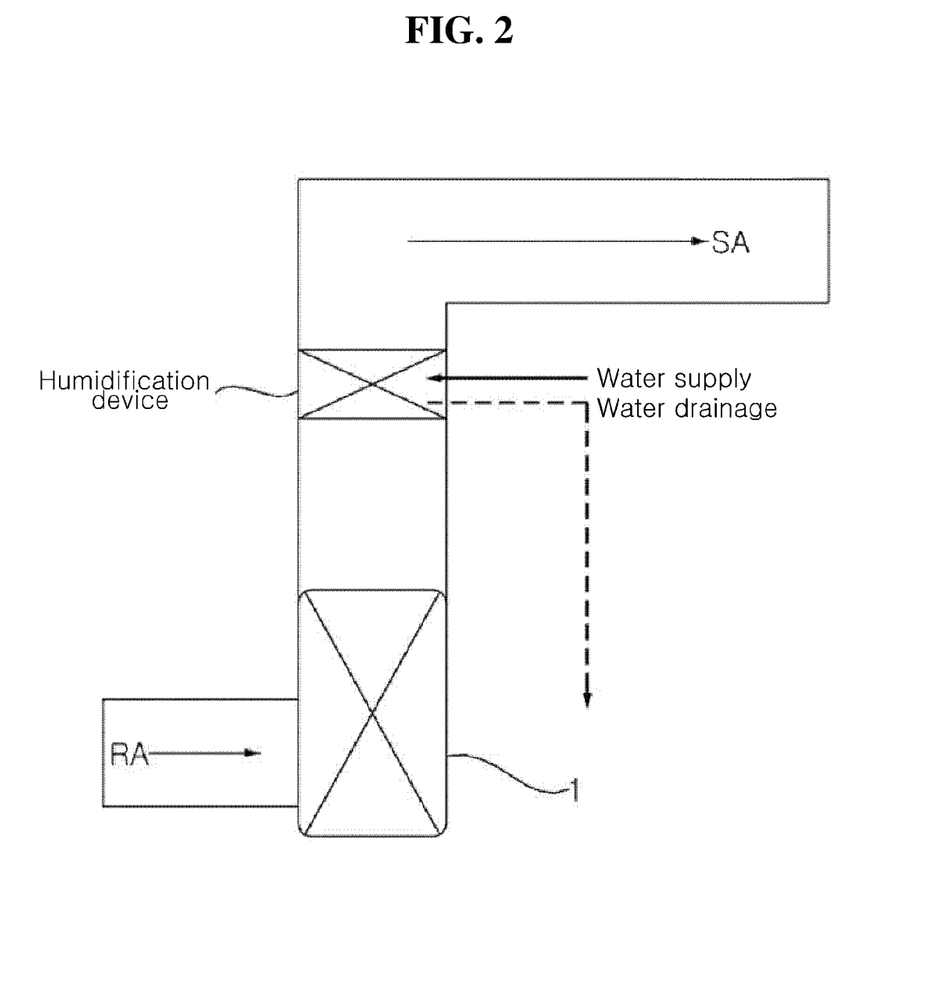
FIG. 2 is a view schematically illustrating a gas furnace equipped with a humidification device that requires the installation of water supply and drainage pipes according to the related art.

FIG. 1 is a perspective view of a gas furnace according to the related art. FIG. 2 is a view schematically illustrating a gas furnace equipped with a humidification device that requires the installation of water supply and drainage pipes according to the related art. FIG. 3 is a perspective view of a gas furnace according to an exemplary embodiment of the present disclosure.

Generally, a gas furnace is an apparatus that heats up a room by supplying air heated through heat exchange with a flame and high-temperature combustion gas P produced by the combustion of a fuel gas R.

Figure 3:
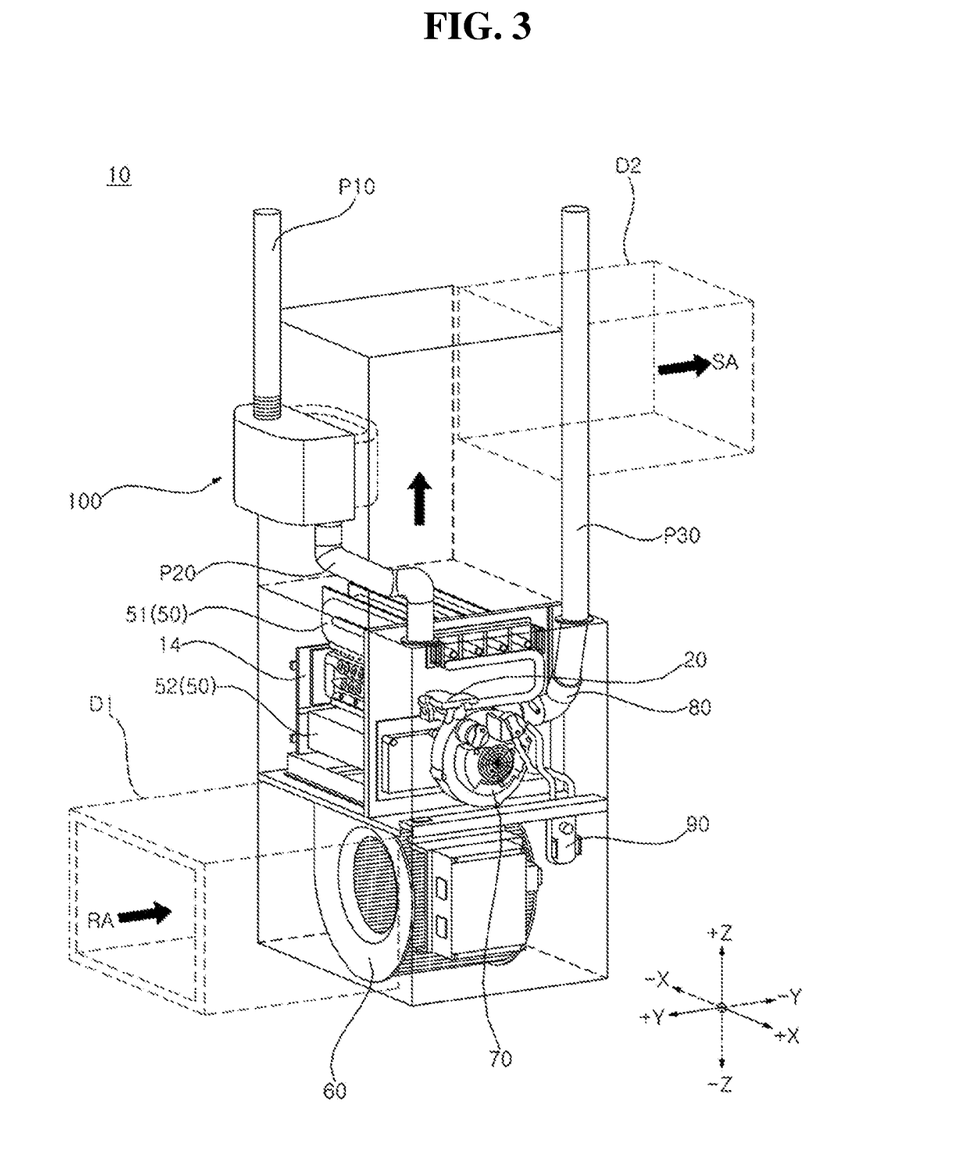
FIG. 3 is a perspective view of a gas furnace according to an exemplary embodiment of the present disclosure.

As illustrated in FIG. 3, the gas furnace 10 according to the exemplary embodiment of the present disclosure includes a gas valve 20 that supplies a fuel gas R to a manifold 30, a burner 40 in which the fuel gas R released from the manifold 30 is mixed with air and flows in an air-fuel mixture, and a heat exchanger 50 through which a combustion gas P produced by the combustion of the air-fuel mixture in the burner 40 flows.

Furthermore, the gas furnace 10 include an inducer 70 for inducing a flow of combustion gas P to an internal vent 80 through the heat exchanger 50, a blower 60 for blowing air around the heat exchanger 50 so that the air is supplied to a room, and a condensate trap 90 for collecting a condensate produced in the heat exchanger 50 and/or the internal vent 80 and discharging it.

The fuel gas R supplied through the gas valve 20 may include, for example, liquefied natural gas (LNG), which is natural gas that has been cooled down to liquid form, or liquefied petroleum gas (LPG), which is prepared by pressurizing gaseous by-products of petroleum refining into liquid form.

As the gas valve 20 opens or closes, the fuel gas R may be supplied to the manifold 30 or its supply may be cut off. Also, the amount of fuel gas R supplied to the manifold 30 may be regulated by adjusting the opening degree of the gas valve 20. As such, the gas valve 20 may regulate the heating power of the gas furnace 10. To this end, the gas furnace 10 according to the exemplary embodiment of the present disclosure may further include a controller for adjusting the opening or closing of the gas valve 20 or its opening degree.

The manifold 30 may guide the fuel gas R to the burner 40, and the fuel gas R, once introduced into the burner 40, may flow in a mixture with air.

The air-fuel mixture flowing through the burner 40 may be burnt due to flame ignition by an igniter. In this case, the combustion of the air-fuel mixture may produce a flame and a high-temperature combustion gas P.

The heat exchanger 50 may have a flow path through which the combustion gas P can flow.

Although the gas furnace 10 according to the exemplary embodiment of the present disclosure will be described hereinafter as including a heat exchanger 50 including a primary heat exchanger 51 and a secondary heat exchanger 52 which are to be described later, only the primary heat exchanger 51 may be provided in some embodiments.

The primary heat exchanger 51 may be placed with one end being adjacent to the burner 40. The other end of the primary heat exchanger 51 opposite the one end may be attached to a coupling box 14. The combustion gas P flowing from one end of the primary heat exchanger 51 to the other end may be conveyed to the secondary heat exchanger 52 via the coupling box 14.

One end of the secondary heat exchanger 52 may be connected to the coupling box 14. The combustion gas P, once passed through the primary heat exchanger 51, may be introduced into one end of the secondary heat exchanger 52 and pass through the secondary heat exchanger 52.

The secondary heat exchanger 52 may allow the combustion gas P passed through the primary heat exchanger 51 to exchange heat with the air passing around the secondary heat exchanger 52.

That is, the thermal energy of the combustion gas P passed through the primary heat exchanger 51 through the secondary heat exchanger 52 may be additionally used by means of the secondary heat exchanger 52, thereby improving the efficiency of the gas furnace 10.

The combustion gas P passed through the secondary heat exchanger 52 may condense through heat transfer to the air passing around the secondary heat exchanger 52, thereby producing a condensate. In other words, the vapor contained in the combustion gas P may condense and turn into condensate.

Due to this reason, the gas furnace 10 equipped with the primary heat exchanger 51 and secondary heat exchanger 52 is also called a condensing gas furnace.

The produced condensate may be collected in a condensate collecting portion 16. To this end, the other end of the secondary heat exchanger 52 opposite the one end may be connected to one side of the condensate collecting portion 16.

An inducer 70 may be attached to the other side of the condensate collecting portion 16. Although the inducer 70 is described as being attached to the condensate collecting portion 16 for ease of explanation, the inducer 70 also may be attached to a mounting panel 12 to which the condensate collecting portion 16 is attached.

The condensate collecting portion 16 may have an opening formed in it. The other end of the secondary heat exchanger 52 and the inducer 70 may communicate with each other via the opening formed in the condensate collecting portion 16.

That is, the combustion gas P passed through the other end of the secondary heat exchanger 52 may be released to the inducer 70 through the opening formed in the condensate collecting portion 16 and then discharged out of the gas furnace 10 through the internal vent 80.

The condensate produced in the secondary heat exchanger 52 may be released to the condensate trap 90 through the condensate collecting portion 16 and then discharged out of the gas furnace 10 through a discharge opening.

As shown in FIG. 3, the condensate trap 90 may collect and discharge the condensate produced in the internal vent 80 connected to the inducer 70, as well as the condensate produced in the secondary heat exchanger 52.

That is, even a combustion gas P not condensed at the other end of the secondary heat exchanger 52 may condense to form a condensate as it passes through the internal vent 80, then collect at the condensate trap 90, and then be discharged out of the gas furnace 10 through the discharge opening.

The inducer 70 may communicate with the other end of the secondary heat exchanger 52 via the opening formed in the condensate collecting portion 16.

One end of the inducer 70 may be attached to the other side of the condensate collecting portion 16, and the other end of the inducer 70 may be attached to the internal vent 80.

The inducer 70 may induce a flow of combustion gas P that passes through the primary heat exchanger 51, coupling box 14, and secondary heat exchanger 52 and is discharged to the internal vent 80. In this regard, the inducer 70 may be understood as an induced draft motor (IDM).

The blower 60 for the gas furnace may be located at the bottom of the gas furnace 10. Air supplied to the room may move upward from the bottom of the gas furnace 10 by the blower 60. In this regard, the blower 60 may be understood as an indoor blower motor (IBM).

The blower 60 may allow air to pass around the heat exchanger 50.

The air passing around the heat exchanger 50, blown by the blower 60, may have a temperature rise by receiving thermal energy from the high-temperature combustion gas P via the heat exchanger 50. The room may be heated as the higher-temperature air is supplied to the room.

The gas furnace 10 according to the exemplary embodiment of the present disclosure may include a casing. The components of the above-described gas furnace 10 may be accommodated inside the casing.

A lower opening may be formed in a side adjacent to the blower 60, at the bottom of the casing. A room air duct D1 through which air (hereinafter, "room air") RA coming from a room passes may be installed in the lower opening.

A supply air duct D2 through which air (hereinafter, "supply air") SA supplied to the room passes may be installed in an upper opening formed at the top of the casing.

That is, when the blower 60 operates, the air coming from the room through the room air duct D1 to be used as the room air RA has a temperature rise as it passes through the heat exchanger 50, and the air may be supplied into the room through the supply air duct D2 and used as the supply air SA, thereby heating the room.

Meanwhile, when hot dry air enters the room in cold weather, it may cause discomfort to a person in the room, which creates the need for humidification and heating operation. In this regard, as illustrated in FIGS. 1 and 2, the gas furnace 1 according to the related art comes with a humidification device which requires the installation of water supply and drainage pipes. However, such a humidification device is difficult to install, replace, and repair, and has problems such as leakage due to the aging of the water supply and drainage pipes, pipe freezing and bursting in the winter, and so forth.

In view of this, the present disclosure has been devised to provide a gas furnace 10 that can regulate the humidity of supply air SA without water supply and drainage (hereinafter, simply referred to as "without water supply").

Hereinafter, referring to FIGS. 3 to 7, components for regulating the humidity of supply air without water supply in the gas furnace according to the exemplary embodiment of the present disclosure and other components associated with them will be described in more details.

Figure 4:
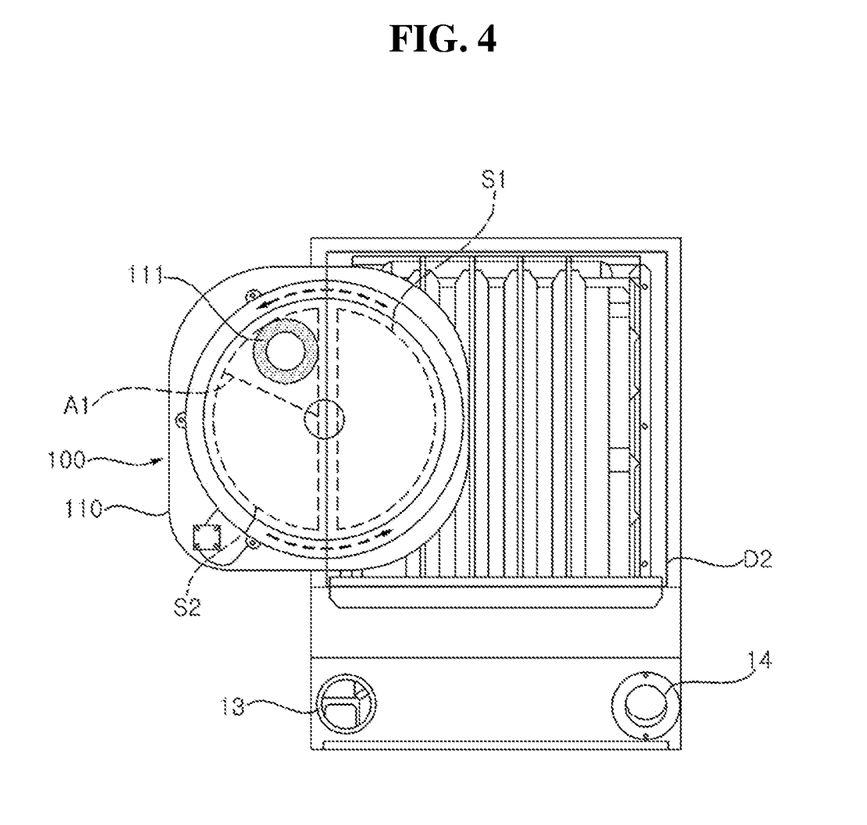
FIG. 4 is a top view of a gas furnace according to an exemplary embodiment of the present disclosure.
Figure 5:
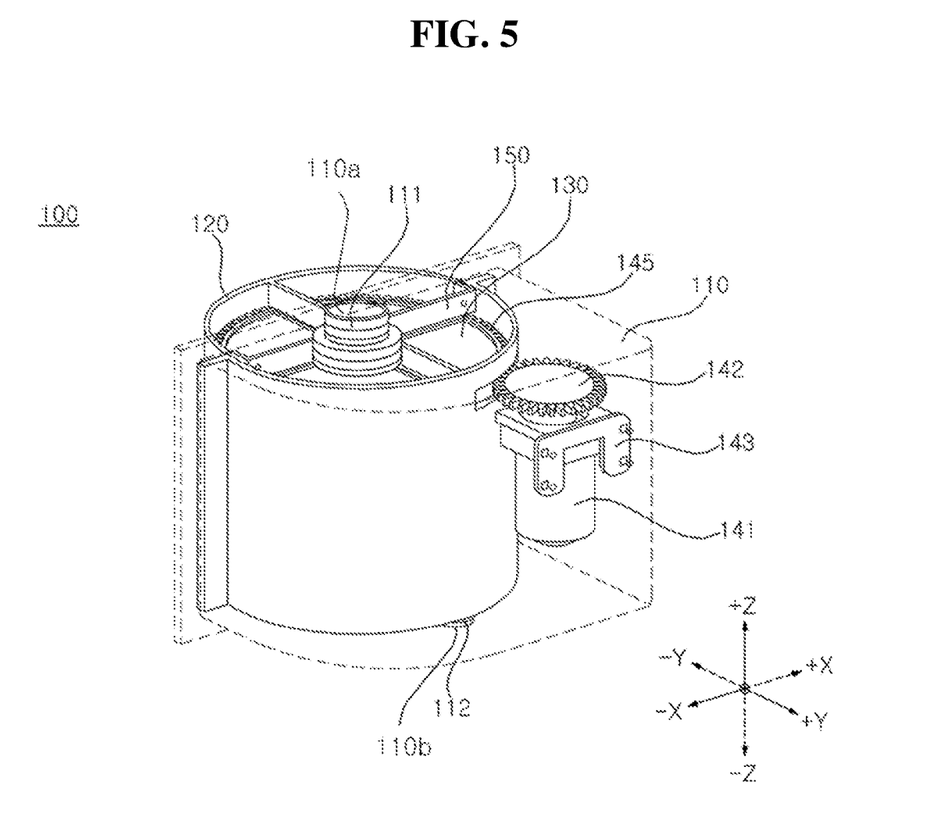
FIG. 5 is a perspective view of the humidification and dehumidification device with no water supply according to the exemplary embodiment of the present disclosure.
Figure 6:
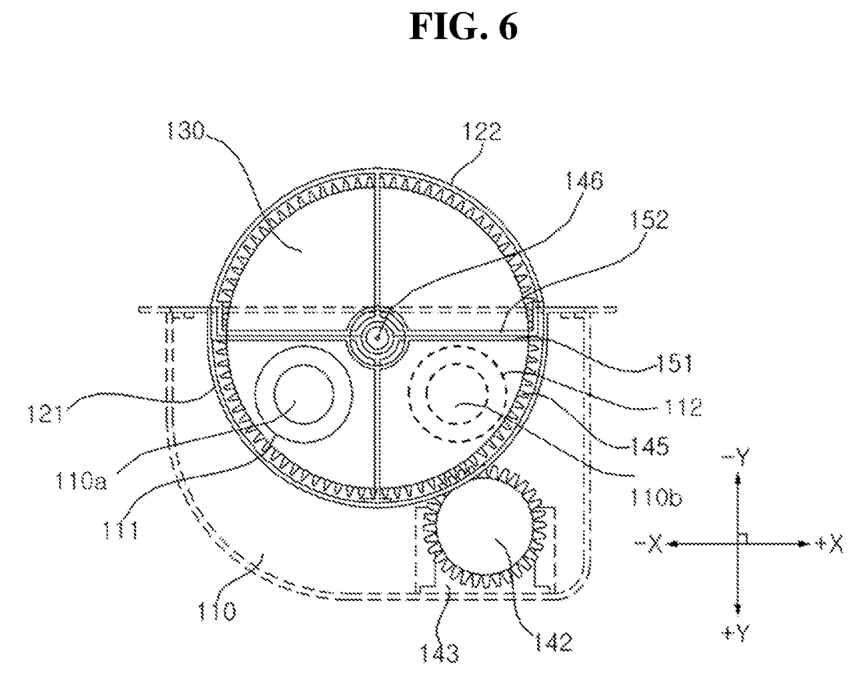
FIG. 6 is a top view of the humidification and dehumidification device with no water supply according to the exemplary embodiment of the present disclosure.
Figure 7:
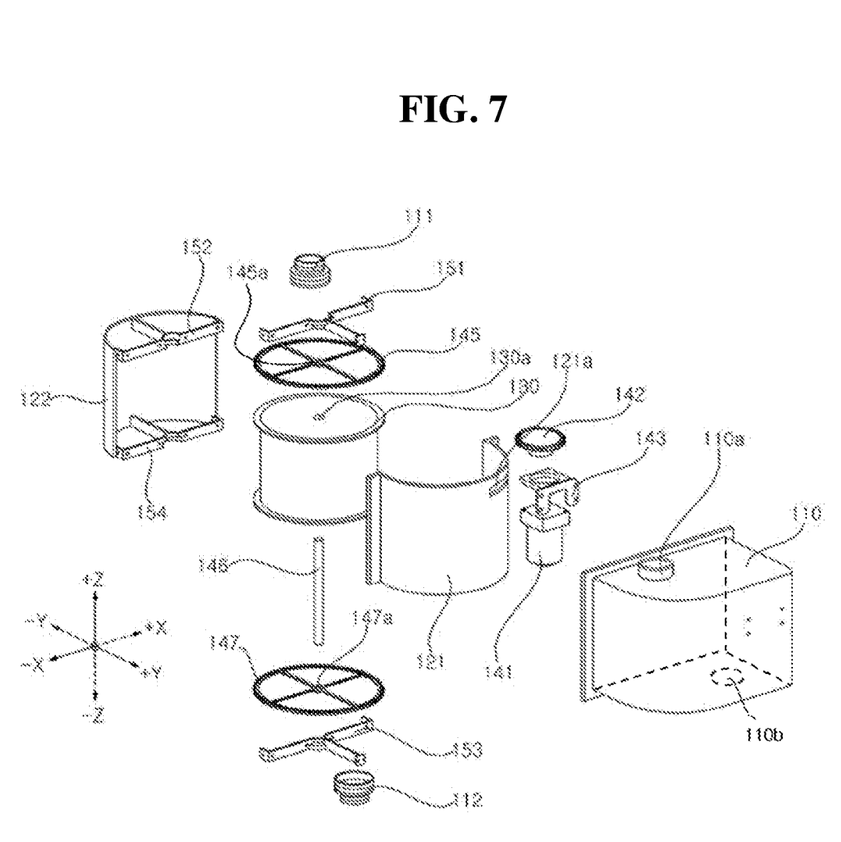
FIG. 7 is an exploded perspective view of the humidification and dehumidification device with no water supply according to the exemplary embodiment of the present disclosure.

FIG. 4 is a top view of a gas furnace according to an exemplary embodiment of the present disclosure. FIG. 5 is a perspective view of the humidification and dehumidification device with no water supply according to the exemplary embodiment of the present disclosure. FIG. 6 is a top view of the humidification and dehumidification device with no water supply according to the exemplary embodiment of the present disclosure. FIG. 7 is an exploded perspective view of the humidification and dehumidification device with no water supply according to the exemplary embodiment of the present disclosure.

As shown in FIG. 3, the gas furnace 10 according to the exemplary embodiment of the present disclosure includes a burner 40, a heat exchanger 50, a duct including a room air duct D1 and a supply air duct D2, a blower 60, an inducer 70, and a humidification and dehumidification device 100 with no water supply.

As described above, the inducer 70 may induce a flow of fluid from an intake pipe to the internal vent 80. That is, the inducer 70 may induce a flow of air taken into the burner 40 through the intake pipe and induce a flow of combustion gas P to the heat exchanger 50 and internal vent 80 from the burner 40.

Meanwhile, as illustrated in FIG. 4, the intake pipe may be connected to an intake port 13 formed on one side of the casing, and an exhaust pipe may be connected to an exhaust port 14 formed on one side of the casing and communicate with the internal vent 80.

As described above, the blower 60 may induce a flow of air passing around the heat exchanger 50. That is, it may induce a flow of the room air RA supplied as the supply air SA to the room through the heat exchanger 50.

As illustrated in FIGS. 3 and 4, the humidification and dehumidification device 100 with no water supply may be installed on one side of the supply air duct D2. The humidification and dehumidification device 100 with no water supply may be partially inserted into the supply air duct D2. As a result, the supply air SA may flow through the part of the humidification and dehumidification device 100 with no water supply inserted into the supply air duct D2, and therefore the amount of moisture contained in the supply air SA may be adjusted by the humidification and dehumidification device 100 with no water supply, which will be described later in more details.

As illustrated in FIGS. 5 to 7, the humidification and dehumidification device 100 with no water supply may include a rotor 130, a casing 110, a rotating mechanism 130, a cover 120, and a guiding member 150.

An adsorbent Ab may be coated on the surface of the rotor 130. The rotor 130 may have a flow path formed therein through which air flows, and the adsorbent Ab may be coated on the flow path of the rotor 130. The adsorbent Ab adsorbs moisture from air at relatively low temperature and desorbs moisture into air at relatively high temperature.

In an example, the adsorbent Ab may be a desiccant. Here, the desiccant is a substance that adsorbs moisture from air at relatively low temperature and releases the absorbed moisture into air at relatively high temperature.

In this case, if the adsorbent Ab reaches its limit in releasing moisture at relatively high temperature and cannot release moisture any longer, because of its limited capacity for adsorbing or releasing moisture, it is necessary to switch to relatively low temperature and absorb moisture from air passing through the adsorbent Ab.

Moreover, if the adsorbent Ab reaches its limit in absorbing moisture at relatively low temperature and cannot absorb moisture any longer, it is necessary to switch to relatively high temperature and release moisture into air passing through the adsorbent Ab.

To this end, the rotor 130 with the adsorbent Ab coated on the surface may be partially inserted into the supply air duct D2 and rotate in a certain direction.

More specifically, the rotor 130 may include a first portion S1 located inside the supply air duct D2 and a second portion S2 located outside the supply air duct D2. In this case, the first and second portions S1 and S2 of the rotor 130 may vary in position as the rotor 130 rotates.

As a result, as opposed to when the rotor 130 does not rotate, the adsorbent Ab coated on the first and second portions S1 and S2 adsorb and desorb moisture repeatedly, thereby preventing its capacity for releasing and adsorbing moisture from reaching a limit. That is, even when relatively high-temperature air flows through the first portion S1, causing moisture desorption from the adsorbent Ab coated on the first portion S1, and relatively low-temperature air flows through the second portion S2, causing moisture adsorption to the adsorbent Ab coated on the second portion S2, the first and second portions S1 and S2 of the rotor 130 may vary in position as the rotor 130 rotates. Thus, a portion of the adsorbent Ab where moisture is desorbed may adsorb moisture, and a portion of the adsorbent Ab where moisture is adsorbed may desorb moisture, thereby preventing its capacity for releasing and absorbing moisture from reaching a limit.

As illustrated in FIGS. 5 and 6, the casing 110 may accommodate the second portion S2 in it. The casing 110 may have a first air-through hole 110a and a second air-through hole 110b formed therein. Moreover, the casing 110 may include first and second couplers 111 and 112 connected to the first and second air-through holes 110a and 110b, respectively, that serve as an intermediary to connect between the first and second air-through holes 110a and 110b and predetermined pipelines to be described later. The casing 110 may internally have a flow path of air passing through the second portion S2 between the first and second air-through holes 110a and 110b.

In the present disclosure, since the first portion S1 is located inside the supply air duct D2, the supply air SA may flow through the first portion S1. Moreover, air introduced from one of the first and second air-through holes 110a and 110b and discharged through the other may flow through the second portion S2.

In an example, as illustrated in FIG. 3, an outside air pipe P10 may be connected to the first air-through hole 110a through the first coupler 111, and an intake pipe P20 may be connected to the second air-through hole 110b through the second coupler 112. As described above, the intake pipe P20 is a pipe through which air to be supplied to the burner 40 flows.

As such, air introduced from the outside air pipe P10 connected to the first air-through hole 110a, passed through the second portion S2, and discharged through the second air-through hole 110b may flow through the intake pipe P20.

When the gas furnace 100 performs heating operation, relatively high-temperature air generated by heating while passing through the heat exchanger 50 may serve as the supply air SA flowing through the supply air duct D2 and be humidified with moisture taken from the adsorbent Ab coated on the first portion S1. Moreover, relatively low-temperature air taken in through the outside air pipe P10 may be dehumidified as it is deprived of moisture by the adsorbent Ab coated on the second portion S2. In this case, the dehumidified air is supplied to the burner 40 through the intake pipe P20, allowing for easy ignition in the burner 40.

Meanwhile, as illustrated in FIGS. 5 to 7, the humidification and dehumidification device 100 with no water supply may further include a guiding member 150 placed on one side of the rotor 130.

The guiding member 150 may separate the first and second portions S1 and S2 and block the air introduced into the first portion S1 from entering the second portion S2 and the air introduced into the second portion S2 from entering the first portion S1.

As such, relatively high-temperature air introduced into the first portion S to get moisture from the adsorbent Ab coated on the first portion S1 may be kept from entering the second portion S2, preventing moisture desorption from the adsorbent Ab coated on the second portion S2 and supposed to adsorb moisture. Moreover, relatively low-temperature air introduced into the second portion S2 to be deprived of moisture from the adsorbent Ab coated on the second portion S2 may be kept from entering the first portion S1, thereby preventing moisture adsorption to the adsorbent Ab coated on the first portion S1 and supposed to desorb moisture.

In an example, the guiding member 150 may include an upper guiding member 151 and 152 and a lower guiding member 153 and 154 disposed on the topside and underside of the rotor 130, respectively.

In this case, the upper guiding member 151 and 152 and lower guiding member 153 and 154 may be firmly attached to adjacent inside surfaces of the casing 100, respectively. That is, part of the upper guide member 151 and 152 may be firmly attached to an inside surface of the casing 110 adjacent in the +Z axis direction, and part of the lower guide member 153 and 154 may be firmly attached to an inside surface of the casing 110 adjacent in the −Z axis direction.

While FIG. 7 illustrates that the upper guiding member 151 and 152 is formed by joining a first upper guiding member 151 and a second upper guiding member 152, they also may be formed as a single body from the beginning. Likewise, while FIG. 7 illustrates that the lower guiding member 153 and 154 is formed by joining a first lower guiding member 153 and a second lower guiding member 154, they also may be formed as a single body from the beginning. Moreover, the guiding member 150 may be attached to an inside surface of a cover 120 to be described later.

As illustrated in FIG. 7, the guiding member 150 may include a first partition wall separating the first and second portions S1 and S2, a second partition wall separating the first portion S1 into at least two parts, and a third partition wall separating the second portion S2 into at least two parts.

In this case, the first and second air-through holes 110a and 110b may correspond in position to the at least two parts separated by the third partition wall. That is, as illustrated in FIG. 4, if the first air-through hole 110a is formed at a position indicated by reference numeral A1 corresponding to one of the two parts separated by the third partition wall, the second air-through hole 110b may be formed at a position corresponding to the other of the two parts separated by the third partition wall, with the counterclockwise rotation of the rotor 130 being taken into consideration. As such, it is possible to secure a large enough area of moisture exchange between the air passing through the second portion S2 and the adsorbent Ab coated on the second portion S2.

As discussed above and below, the humidification and dehumidification device 100 with no water supply allows for continuous adsorption and desorption of moisture to and from the adsorbent Ab by allowing the rotor 130 to rotate periodically at constant speed by means of a rotating mechanism 140.

As illustrated in FIGS. 5 to 7, the rotating mechanism 140 may include a rotary motor 141, a pinion 142, and a gear member 145.

The rotary motor 141 may be electrically driven, and the pinion 142 may be connected to a rotating shaft of the rotary motor 141 and rotate. The rotary motor 141 may be attached to one side of the casing 110 via a motor bracket 143. The gear member 145 may include gear teeth meshing with the pinion 142, with one side being attached to the rotor 130.

As such, when the pinion 142 rotates with the rotation of the rotary motor 142, the gear member 145 may be rotated, causing the rotor 130 attached to the gear member 145 to rotate in a certain direction.

In some embodiments, as illustrated in FIG. 7, the gear member 145 may include a first gear member 145 and a second gear member 147. In this case, a gear shaft 146 penetrating a through-hole 130a of the rotor 130 may be attached to holes 145a and 147a formed respectively in the first and second gear members 145 and 147. That is, when the pinion 142 rotates with the rotation of the rotary motor 141, the first and second gear members 145 and 147 may be rotated, causing the rotor 130 attached to the first and second gear members 145 and 147 to rotate more stably about the gear shaft 146.

Meanwhile, in the exemplary embodiment of the present disclosure, the power of the rotary motor 141 may be transferred to the rotor 130 by a pulley, instead of the pinion 142 and gear member 145.

The humidification and dehumidification device 100 with no water supply may further include a cover 120 interposed between the rotor 130 and the casing 110 to surround the outer side of the rotor 130. Although FIG. 7 illustrates that the cover 130 is formed by joining first and second covers 121 and 122, they also may be formed as a single body from the beginning.

A coupling slot 121a may be formed on one side of the cover 120. The pinion 142 and the gear member 145 may mesh with each other through the coupling slot 12a.

What has been described above is the construction of the humidification and dehumidification device 100 with no water supply equipped in a gas furnace 10 according to an exemplary embodiment of the present disclosure and the operating principle of humidification and heating operation based on this construction.

Meanwhile, a gas furnace 10 according to another exemplary embodiment of the present disclosure may perform dehumidification and cooling operation as well as the above-mentioned humidification and heating operation, which will be described later in more details with reference to FIGS. 8 to 10. However, redundant explanation will not be given of the components of the gas furnace 10 according to the exemplary embodiment of the present disclosure that have been already explained.

Figure 8:
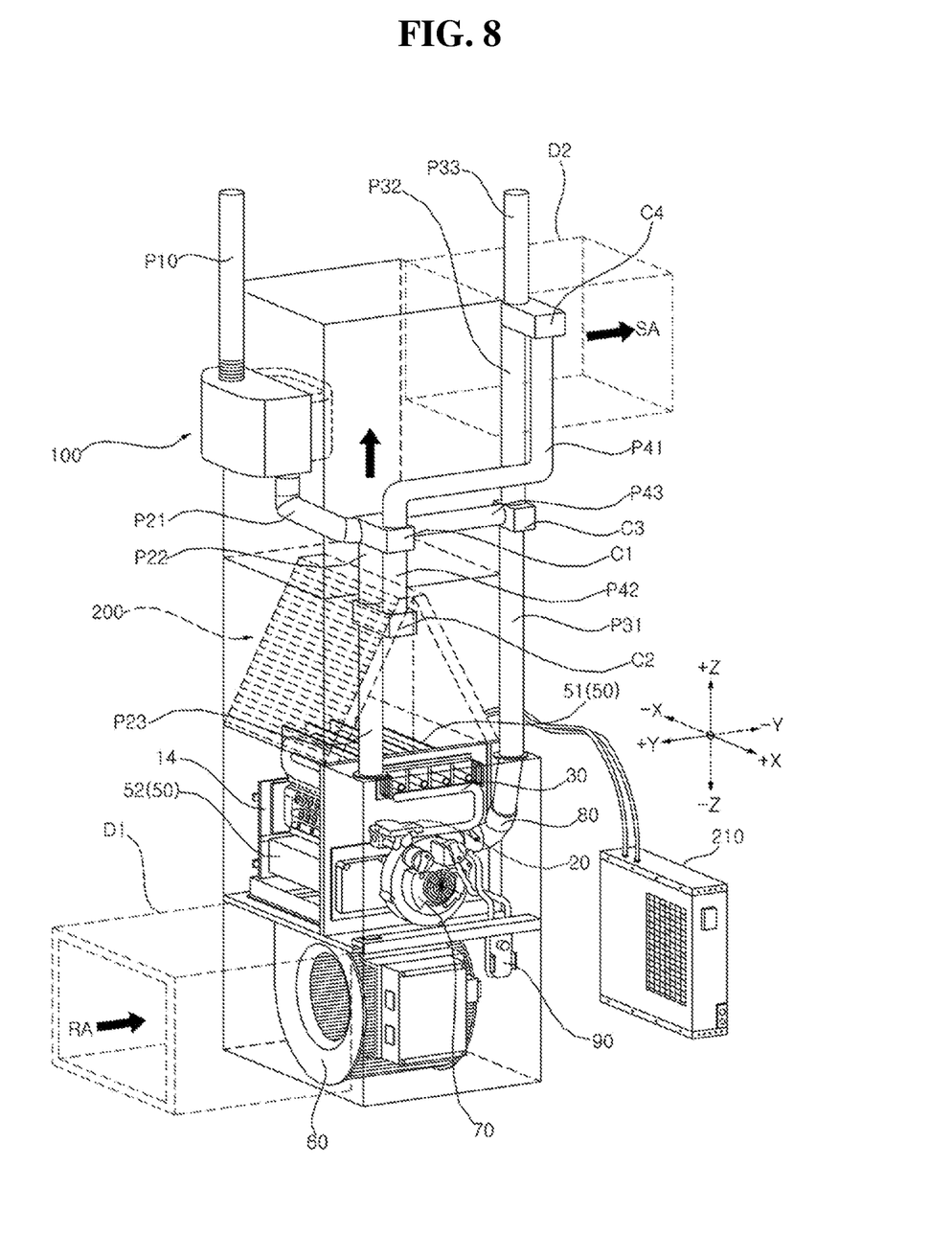
FIG. 8 is a perspective view of a gas furnace according to another exemplary embodiment of the present disclosure.

FIG. 8 is a perspective view of a gas furnace according to another exemplary embodiment of the present disclosure. FIG. 9 is a perspective view of a damper according to the exemplary embodiment of the present disclosure. FIG. 10 is an exploded perspective view of the damper according to the exemplary embodiment of the present disclosure.

As illustrated in FIG. 8, the gas furnace 10 according to another exemplary embodiment of the present disclosure may include a cooling coil 200. The cooling coil 200 may be disposed inside the supply air duct D2 and have a refrigerant pipeline 201 through which refrigerant C flows.

The cooling coil 200 may be disposed above or in the +Z axis direction of the heat exchanger 50. Furthermore, the cooling coil 200 may include a first cooling coil 200a and a second cooling coil 200b sloping toward each other. In this case, in order to improve the heat transfer performance between air and the cooling coil 200, the first and second cooling coils 200a and 200b may partially abut each other at the top, and the distance between them may get larger toward the bottom or in the −Z axis direction, in which case the cooling coil 200 is shaped like a letter "A" and therefore often called an A-coil. The shape "A" of the exterior appearance of the first and second cooling coils 200a and 200b may be formed in the YZ plane.

The cooling coil 200 may be connected to an outdoor unit 210 by means of the cooling pipeline 201. That is, when the gas furnace 10 is in cooling operation, the refrigerant C may circulate through the cooling coil 200 and the outdoor unit 210.

In an example, the outdoor unit 210 may include a compressor, a condenser, and an expansion valve, and the cooling coil 200 may be understood as an evaporator. That is, the cooling operation of the gas furnace 10 takes place as the refrigerant C travels through a cycle of compression, condensation, expansion, and evaporation, which will be described as follows.

The cycle of cooling operation of the gas furnace 10 may be performed in such a way that a high-temperature, high-pressure refrigerant C discharged from the compressor dissipates heat to the surrounding air at the condenser, then is discharged at low temperature and low pressure as it passes through the expansion valve, then absorbs heat from the surrounding air at the cooling coil 200 and evaporates in a gaseous form, and then enters the compressor.

Here, the surrounding air passing through the condenser is outside air present around the outdoor unit 210, and the surrounding air passing through the cooling coil 200 is room air RA which is introduced from the room through the room air duct D1. That is, the room air RA may be cooled as it passes through the cooling coil 200, and may be supplied as supply air SA to the room through the supply air duct D2, thus cooling the room.

At this point, the blower 60 may induce a flow of the room air RA supplied as the supply air SA to the room past the cooling coil 200.

Like the above-described gas furnace 10 according to an exemplary embodiment of the present disclosure, the gas furnace 10 according to another exemplary embodiment of the present disclosure may include an intake pipe through which air supplied to the burner 40 flows, an exhaust pipe through which a fluid passed through the heat exchanger 50 flows, and an inducer 70 that induces a flow of fluid from the intake pipe to the exhaust pipe.

The difference is that the gas furnace 10 according to another exemplary embodiment of the present disclosure may perform the above-described cooling operation as well as the heating operation. Thus, when the gas furnace 10 is in heating operation, air flowing through the intake pipe is supplied to the burner 40, creating a combustion reaction with fuel gas R, whereas, when the gas furnace 10 is in cooling operation, the above combustion reaction does not occur even if the air is supplied to the burner 40. As used herein, the fluid flowing through the heat exchanger 50 and the exhaust pipe refers to combustion gas P when the gas furnace 10 is in heating operation, and refers to the air passed through the intake pipe and the burner 40 when the gas furnace 10 is in cooling operation.

As illustrated in FIG. 8, the intake pipe and the exhaust pipe each may include a plurality of pipelines connected via a plurality of chambers C1, C2, C3, and C4, and their flow path varies depending on the operation of a damper 300 for regulating the opening and closing of the plurality of pipelines.

The gas furnace 10 according to another exemplary embodiment of the present disclosure may further include a controller that provides either humidification and heating operation or dehumidification and cooling operation by controlling whether to supply the fuel gas R to the burner 40 or not, whether to supply the refrigerant C to the refrigerant pipeline 201 or not, and the operation of the damper 300.

Here, the humidification and heating operation is an operation in which the room air RA is heated and humidified while passing through the heat exchanger 50 and the humidification and dehumidification device 100 with no power supply and supplied as the supply air SA to the room. The dehumidification and cooling operation is an operation in which the room air RA is cooled and dehumidified while passing through the cooling coil 200 and the humidification and dehumidification device 100 with no water supply and supplied as the supply air SA to the room.

The controller may control the gas furnace 10 to perform the humidification and heating operation or the dehumidification and cooling operation based on the difference between the indoor temperature and a desired temperature and a signal issued by the difference between the indoor temperature and the desired temperature. In some embodiments, the signal may be a signal issued when a person in the room gives a certain input.

When performing the humidification and heating operation, the controller may control the components of the gas furnace 10 as follows.

That is, the controller may perform control in such a way as to supply the fuel gas R and cut off the supply of the refrigerant C to the refrigerant pipeline 201.

Moreover, the controller may control the operation of the damper 300 in such a way that the air introduced from the outside air pipe connected to the first air-through hole 110a, passed through the second portion S2, and discharged through the second air-through hole 110b flows through the intake pipe P20, one side of which is connected to the second air pass-through hole 110b, and the combustion gas P passed through the heat exchanger 50 flows through the exhaust pipe.

In this case, a pipeline constituting the outside air pipe is denoted by reference numeral P10, pipelines constituting the intake pipe are denoted by reference numerals P21, P22, and P23, and pipelines constituting the exhaust pipe are denoted by reference numerals P31, P32, and P33.

As such, the adsorbent Ab coated on the second portion S2 adsorbs moisture from relatively low-temperature air passing through the second portion S2, whereas the adsorbent Ab coated on the first portion S1 desorbs moisture into relatively high-temperature air (i.e., air heated by the heat exchanger 50 for use as supply air SA) passing through the first portion S1. Therefore, humidified, high-temperature air may be supplied to the room.

When performing the dehumidification cooling operation, the controller may control the components of the gas furnace 10 as follows.

That is, the controller may perform control in such a way as to supply the refrigerant C to the refrigerant pipeline 201 and cut off the supply of the fuel gas R to the burner 40.

Moreover, the controller may control the operation of the damper 300 in such a way that the air introduced from the outside air pipe flows through the intake pipe and the air introduced through the second air pass-through hole 110b, passed through the second portion S2, and discharged through the first air pass-through hole 110a flows through the exhaust pipe, one side of which is connected to the second air pass-through hole 110b.

In this case, a pipeline constituting the outside air pipe is denoted by reference numeral P33, pipelines constituting the intake pipe are denoted by reference numerals P41, P42, and P23, and pipelines constituting the exhaust pipe are denoted by reference numerals P31, P43, and P21.

Furthermore, the dehumidification device 100 with no water supply may further include a heater H for heating the air introduced through the second air pass-through hole 110b. In an example, the heater H may be installed at the bottom of the second portion S2 of the rotor 130 or on the pipeline of reference numeral P21. The controller may perform control such that the heater H is activated when performing the above-described dehumidification and cooling operation.

As such, the adsorbent Ab coated on the second portion S2 desorbs moisture into relatively high-temperature air (i.e., air heated by the heater H) passing through the second portion S2, whereas the adsorbent Ab coated on the first portion S1 adsorbs moisture from relatively low-temperature air (i.e., air cooled by the cooling coil 200 for use as supply air SA) passing through the first portion S1.

Therefore, dehumidified, low-temperature air may be supplied to the room.

The damper 300 may be installed inside the chambers C1, C2, C3, or C4 and regulate the opening and closing of the pipelines connected to the chambers C1, C2, C3, and C4 as it moves along with the motion of the motor, thereby allowing the pipelines to function as the intake pipe or exhaust pipe, as described previously.

While the present disclosure does not specifically limit the detailed construction and operating principle of the damper 300 for regulating the opening and closing of the pipelines, the construction and operating principle of the damper installed on the chamber corresponding to reference numeral C3 will be described below by way of example with reference to FIGS. 9 and 10.

Figure 9:
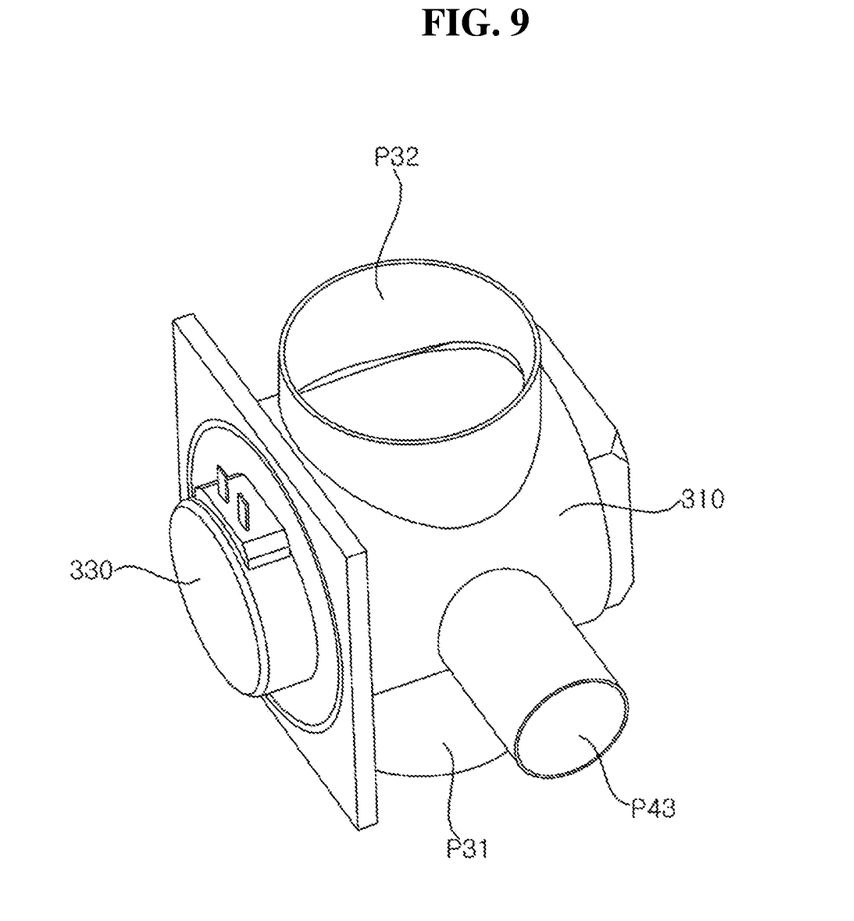
FIG. 9 is a perspective view of a damper according to the exemplary embodiment of the present disclosure.
Figure 10:
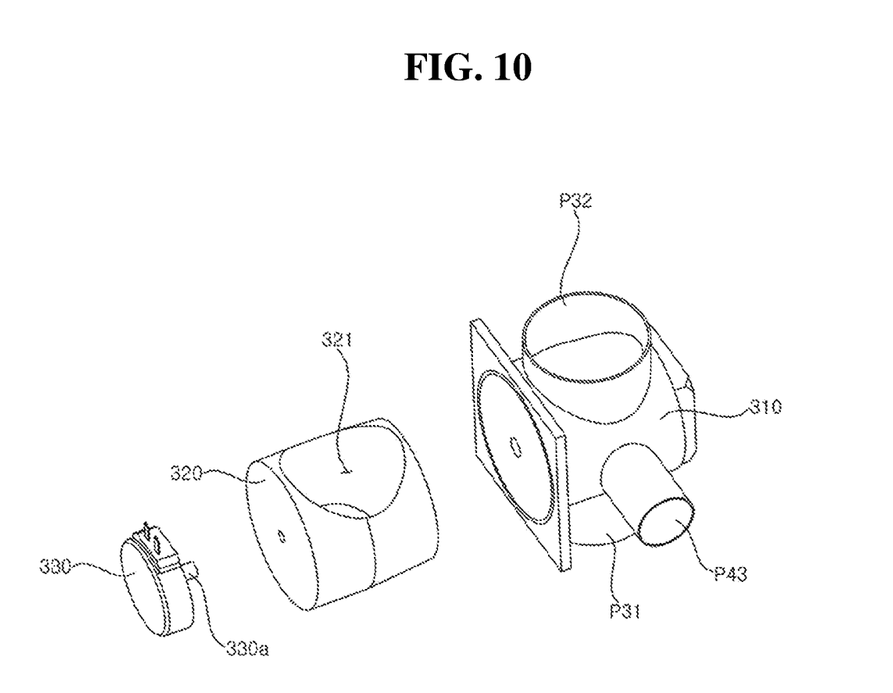
FIG. 10 is an exploded perspective view of the damper according to the exemplary embodiment of the present disclosure.

As illustrated in FIGS. 9 and 10, the damper 300 may include a damper housing 310, a flow path guide 320, and a rotary motor 330.

The damper housing 310 may be installed on the chamber C3 (or a chamber corresponding to another reference numeral) and form the exterior of the damper 300. Th pipelines of reference numerals P31, P32, and P43 may be connected to the damper housing 310.

The flow path guide 320 may be rotatably disposed inside the damper housing 310. A flow path formed in the pipeline of reference numeral P31 may communicate with a flow path formed in the pipeline of reference numeral P32 via a flow path 321 formed in the flow path guide 320. If the flow path guide 320 is rotated at a predetermined angle, the flow path formed in the pipeline of reference numeral P31 may communicate with a flow path formed in the pipeline of reference numeral P43 via the flow path 321 formed in the flow path guide 320.

The rotary motor 330 may include a rotating shaft 330a connected to one side of the flow path guide 320 to rotate the flow path guide 320.

That is, when performing the humidification and heating operation, the controller may control the rotation of the rotary motor 330 so that the fuel gas P flowing through the pipeline of reference numeral P31 enters the pipeline of reference numeral P32 past the flow path guide 320.

Also, when performing the dehumidification and cooling operation, the controller may control the rotation of the rotary motor 330 so that the fuel gas P flowing through the pipeline of reference numeral P31 enters the pipeline of reference numeral P43 past the flow path guide 320.

However, the construction and operating principle of the damper 300 installed inside the chambers C1, C2, C3, and C3 to regulate the opening and closing of the pipelines are not limited to the above example.

In the above, a gas furnace according to an exemplary embodiment of the present disclosure has been described with reference to the accompanying drawings. However, the present disclosure is not limited to the above embodiments, and it will be apparent to those skilled in the art that various modifications or implementations within the equivalent scopes can be made without departing from the subject matter of the present disclosure.

The present disclosure provides one or more of the following advantages.

Firstly, the amount of moisture contained in air to be supplied to a room can be adjusted without the installation of water supply and drainage pipes since an adsorbent is coated on the surface of the humidification and dehumidification device with no water supply installed on one side of the supply air duct.

Secondly, the rotor with an adsorbent coated on the surface is partially located inside the supply air duct and rotates in a certain direction, and therefore the adsorbent adsorbs and desorbs moisture repeatedly, thereby continuously humidifying and dehumidifying the air supplied to the room.

Thirdly, both heating operation and cooling operation can be performed by means of a cooling coil through which refrigerant flows, and this also allows for humidification heating operation and dehumidification cooling operation using the humidification and dehumidification device with no water supply.

What is claimed is:
1. A gas furnace comprising:
a burner in which a mixture of air and fuel gas burns;
a heat exchanger through which a combustion gas produced by the combustion of the mixture flows;
a duct comprising a room air duct through which air coming from a room passes and a supply air duct through which air supplied to the room passes;
a blower that induces a flow of the room air supplied as the supply air to the room through the heat exchanger; and
a humidification and dehumidification device being installed on one side of the supply air duct for adjusting the amount of moisture contained in the supply air,
wherein the humidification and dehumidification device comprises:
a rotor with an adsorbent coated on the surface that rotates in a certain direction, the rotor comprising a first portion located inside the supply air duct and a second portion located outside the supply air duct;
a casing that accommodates the second portion therein and has a first air-through hole and a second air-through hole formed therein, with a flow path of air passing through the second portion between the first and second air-through holes;
a guiding member placed on one side of the rotor, the guiding member comprises a first partition wall sepa- rating the first and second portions and a third partition wall separating the second portion into at least two parts, wherein the first and second air-through holes correspond in position to the at least two parts separated by the third partition wall, and wherein there is no water supply installed on the humidification and dehumidification device.

2. The gas furnace of claim 1, wherein the first and second portions vary in position as the rotor rotates.

3. The gas furnace of claim 2, wherein the humidification and dehumidification device further comprises:
   a rotary motor that is electrically driven;
   a pinion connected to a rotating shaft of the rotary motor; and
   a gear member including gear teeth meshing with the pinion, with one side being attached to the rotor.

4. The gas furnace of claim 3, wherein the humidification and dehumidification device further comprises a cover interposed between the rotor and the casing to surround the outer side of the rotor.

5. The gas furnace of claim 4, wherein the pinion and the gear member mesh with each other through a coupling slot formed on one side of the cover.

6. The gas furnace of claim 4, wherein the guiding member is configured to separate the first and second portions and blocking the air introduced into the first portion from entering the second portion and the air introduced into the second portion from entering the first portion.

7. The gas furnace of claim 6, wherein the guiding member further comprises an upper guiding member and a lower guiding member disposed on the topside and underside of the rotor, respectively,
   the upper guiding member and lower guiding member being firmly attached to adjacent inside surfaces of the casing, respectively.

8. The gas furnace of claim 6, wherein the guiding member is attached to an inside surface of the cover, and further comprises a second partition wall separating the first portion into at least two parts.

* * * * *